United States Patent
Oguro

[11] Patent Number: 5,880,585
[45] Date of Patent: Mar. 9, 1999

[54] APPARATUS INCLUDING A WHEEL COUPLED RING SHAPED MAGNET, FOR DETECTING ROTATION OF A WHEEL IN A TWO-WHEELED VEHICLE

[75] Inventor: Yuji Oguro, Niigata, Japan

[73] Assignee: Nippon Seiki K.K., Niigata, Japan

[21] Appl. No.: 807,744

[22] Filed: Feb. 27, 1997

[30] Foreign Application Priority Data

Feb. 28, 1996 [JP] Japan ................................ 8-41240

[51] Int. Cl.[6] ............... G01P 3/487; G01P 1/02; G01P 3/44
[52] U.S. Cl. ............ 324/174; 73/514.39; 324/207.22
[58] Field of Search ..................... 324/173, 174, 324/207.2, 207.21, 207.22, 207.25; 73/514.39; 180/170; 188/181 R; 303/138; 384/448; 340/671

[56] References Cited

U.S. PATENT DOCUMENTS

| | | | |
|---|---|---|---|
| 3,731,533 | 5/1973 | Geery | ................................. 324/174 X |
| 3,915,266 | 10/1975 | Lantz . | |
| 4,257,040 | 3/1981 | Shirasaki et al. | .................. 324/174 X |

FOREIGN PATENT DOCUMENTS

| | | | |
|---|---|---|---|
| 113374 | 9/1979 | Japan | ..................................... 324/174 |
| 2-264817 | 10/1990 | Japan . | |

*Primary Examiner*—Gerard Strecker
*Attorney, Agent, or Firm*—McDermott, Will & Emery

[57] ABSTRACT

A rotation detector comprising a housing having an inserting portion for inserting a wheel shaft, a magnet, to be coupled to a wheel mounted to the wheel shaft, into which the inserting portion is inserted such that the magnet is rotated in synchronism with the wheel mounted to the wheel shaft, and a magnetic conversion element arranged at a portion of the housing in the proximity of the magnet.

9 Claims, 3 Drawing Sheets ical type for transmitting a signal indicative of the number of rotations of a wheel of a two-wheeled vehicle such as a motorcycle, a bicycle or the like, to a speedometer or the like.

APPARATUS INCLUDING A WHEEL COUPLED RING SHAPED MAGNET, FOR DETECTING ROTATION OF A WHEEL IN A TWO-WHEELED VEHICLE

FIELD OF THE INVENTION

The present invention relates to a rotation detector of an electric type for transmitting a signal indicative of the number of rotations of a wheel of a two-wheeled vehicle such as a motorcycle, a bicycle or the like, to a speedometer or the like.

BACKGROUND OF THE INVENTION

A conventional rotation detector has been disclosed in Japanese Unexamined Patent Publication No. JP-2-264817. When such a rotation detector is used as a rotation detector for a two-cycle vehicle (for example, motorcycle), a magnetic conversion element (Hall IC) mounted to a circuit board and a magnet are arranged in a resin case in a substantially cylindrical shape having a detecting face for detecting an object for detection along the detecting face, and the circuit board, the magnetic conversion element and the magnet are sealed by a sealing member comprising epoxy etc. thereby constituting a rotation detector. Further, it is general to install the rotation detector to a transmission case or a sprocket cover for detecting a blade edge etc. of a transmission gear or a sprocket rotating at the inside thereof as the object for detection.

When a tooth, etc. of a transmission gear or a sprocket is detected as the object for detection by using such a rotation detector, more or less clearance is present at the object for detection and therefore, a vibration is caused in the object for detection depending on the rigidity of the body of a vehicle (two-cycle vehicle) or an amount of exhaust etc. whereby a gap between the object for detection and a detecting position of the rotation detector is varied, causing a change in magnetism in the rotation detector. The change produces a noise in detection which gives rise to cause erroneous operation of, for example, an indicating instrument displaying the speed in accordance with output data outputted from the rotation detector.

Further, the shape and the size of the object for detection are varied according to the kind of vehicle and therefore, it is necessary to adjust the gap for detection between the object for detection and the rotation detector which complicates the integrating operation performance.

SUMMARY OF THE INVENTION

In view of the foregoing, an object of the present invention is to provide a rotation detector facilitating integrated operation performance and preventing the noise in detection from occurring.

The present invention comprises a housing having an inserting portion for inserting a wheel shaft, a magnet into which the inserting portion is inserted such that the magnet is rotated in synchronism with a wheel mounted to the wheel shaft and a magnetic conversion element arranged at a portion of the housing in the proximity of the magnet.

The invention comprises further a housing having an inserting portion for inserting a wheel shaft, a magnet into which the inserting portion is inserted such that the magnet is rotated in synchronism with a wheel mounted to the wheel shaft, and a magnetic conversion element detecting a change in magnetic poles of the magnet. A first accommodating portion, formed at the periphery of the inserting portion for accommodating the magnet, and a second accommodating portion for arranging the magnetic conversion element in the proximity of the magnet, are formed in the housing.

The present invention comprises still further a housing having a cylindrical inserting portion for inserting a wheel shaft, a magnet having rotation support pieces for rotating in synchronism with a wheel mounted to the wheel shaft and a cylindrical portion that is magnetized and into which the inserting portion is inserted, and a magnetic conversion element mounted to a circuit board for detecting a change in magnetic poles magnetized to the cylindrical portion. A first accommodating portion, formed at the periphery of the inserting portion for accommodating the magnet, and a second accommodating portion, for arranging the magnetic conversion element, are formed in the housing. The circuit board is arranged along a guide portion formed in the second accommodating portion positioning the magnetic conversion element in the proximity of the magnet.

In one aspect of the invention, a magnetic detecting face corresponding to a detecting face of the magnetic conversion element arranged at the second accommodating portion, is formed on an inner wall of the first accommodating portion.

In another aspect of the invention, a holding piece projected in a direction of the wheel and a flange portion extended outwardly from the holding piece are formed at the periphery of the first accommodating portion of the housing, and an elastic member arranged on the flange portion along the holding piece is provided.

In a still further aspect of the invention, a groove portion is formed at a side end face of the elastic member.

The foregoing and other objects, features, aspects and advantages of the present invention will become readily apparent to those skilled in this art from the following detailed description with reference to the accompanying drawings. As will be realized, the invention is capable of other and different embodiments in various obvious respects, all without departing from the invention. Accordingly, the drawings and description are to be regarded as illustrative in nature and not as restrictive.

DETAILED DESCRIPTION OF THE DRAWINGS

Figure 1:
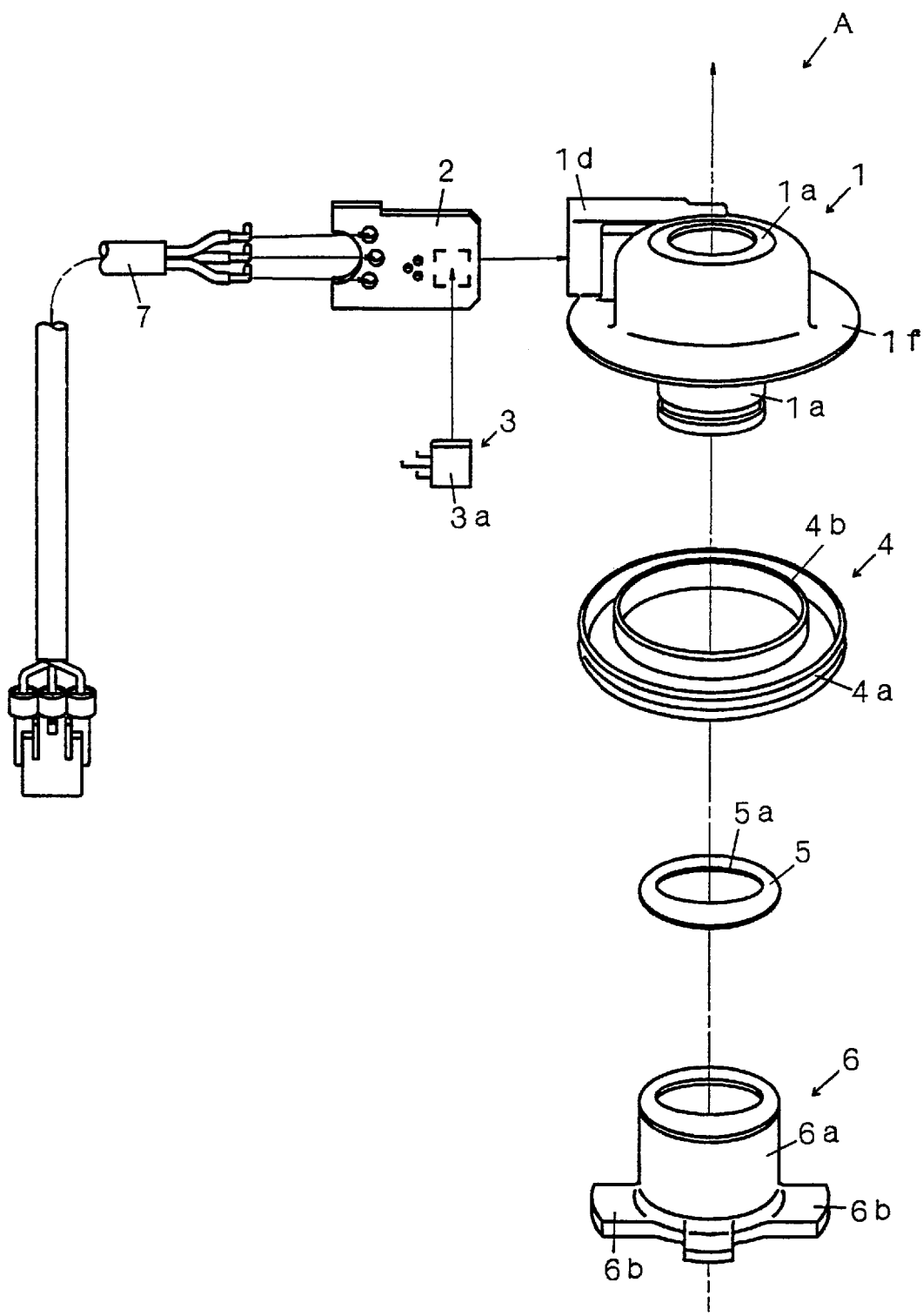
FIG. 1 is an exploded perspective view of a rotation detection of the present invention.

An explanation of the invention is given by taking an example of detection of the number of rotations of the wheel of a motorcycle, etc. However, the present invention can be used with any two-cycle wheels.

The rotation detector of the present invention is provided with a housing, mounted to a wheel shaft, having a cylindrical inserting portion for inserting the wheel shaft, a magnet having rotation support pieces for rotating in synchronism with a wheel mounted to the wheel shaft and a cylindrical portion that is magnetized and into which the inserting portion is inserted, and a magnetic conversion element for detecting a change in magnetic poles magnetized to the cylindrical portion, wherein a first accommodating portion formed at the periphery of the inserting portion for accommodating the magnet and a second accommodating portion for arranging the magnetic conversion element in the proximity of the magnet, are formed at the housing and a circuit board for mounting the magnetic conversion element is accommodated in the second accommodating portion whereby the magnetic conversion element is arranged in the proximity of the magnet. For example, when the rotation detector is directly installed to the wheel shaft of the motorcycle, etc., the magnet is rotated in synchronism with the rotation of the wheel and the change in the magnetic poles of the magnet can be detected by the magnetic conversion element. Therefore, accurate rotation detection is provided since it does not receive influence of detection noise caused by vibration of an object for the detection as in the conventional case.

Further, the magnetism detecting face corresponding to the detecting face of the magnetic conversion element that is arranged to the second accommodating portion via the circuit board, is formed on the inner wall of the first accommodating portion by which the detection distance between the detecting face of the magnetic conversion element and the magnet can preferably be secured, therefore, accurate rotation detection is provided. Also, a troublesome adjusting step for adjusting the detection distance between the object for detection and the detecting face of the rotation detector as in the conventional case is dispensed with whereby the integrated operation performance of the rotation detector can be promoted.

Further, the holding piece projected in the direction of the wheel at the periphery of the first accommodating portion of the housing and the flange portion extended outwardly from the holding piece, are formed. The elastic member at the side end face of which a groove portion for coating a lubricant such as grease is formed, is press-fitted to the holding piece whereby it is arranged at the flange portion. Thereby, at a portion where a hub of the wheel and the rotation support pieces of the magnet are brought into contact with each other, vibration of the wheel caused in running a vehicle is attenuated by the elastic member, the burden on the rotation support pieces is alleviated and the rotation of the wheel is preferably secured. Moreover, water, mud, dust or the like can be prevented from invading a portion of the hub of the wheel where the rotation detector is attached.

Figure 2:
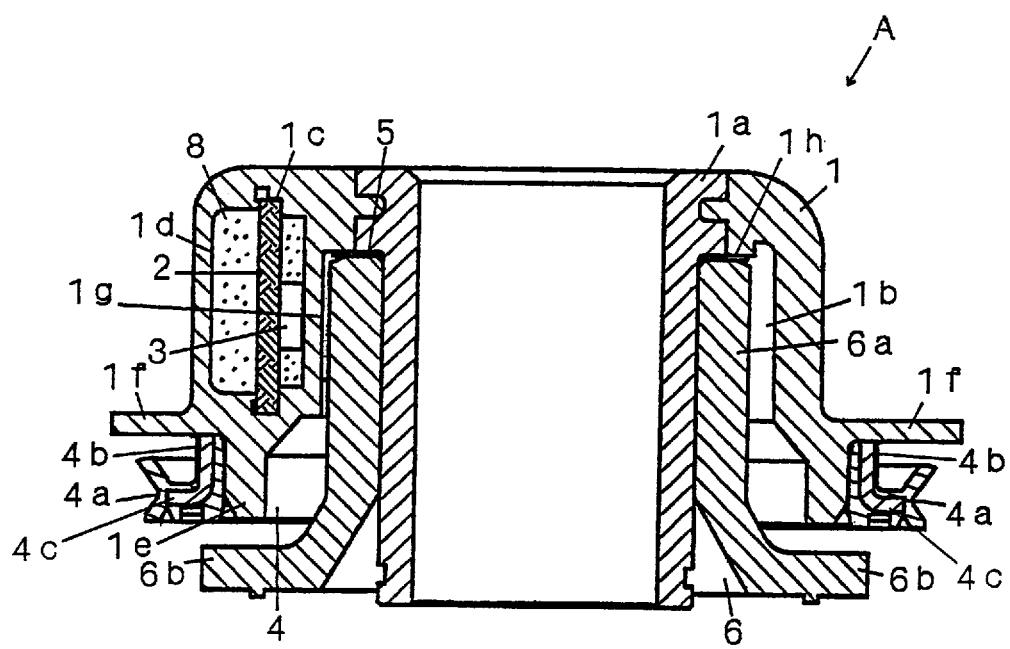
FIG. 2 is a sectional view of essential portions of the rotation detector of the present invention.

Referring to FIG. 1 and FIG. 2, the rotation detector A is constituted by a housing 1 made of a resin material, a circuit board 2 provided with a predetermined wiring pattern, not illustrated, a magnetic conversion element 3 comprising Hall ICs or the like, an elastic member 4 made of a rubber material, a spacer 5 made of a resin material, a magnet 6 and wiring cords 7 electrically connected to the magnetic conversion element 3 via the circuit board 2.

The housing 1 is made of a resin material such as polybutylene terephthelate, nylon or the like. A cylindrical inserting portion 1a made of a metal material into which a wheel shaft, mentioned later, is inserted, is formed by inserting it into a substantially central portion of the housing 1. A first accommodating portion 1b in a cylindrical shape for rotatably arranging a magnet 6, mentioned later in details, at the outer periphery of the inserting portion 1a, is formed at the periphery of the inserting portion 1a. A second accommodating portion 1d for accommodating the magnetic conversion element 3 mounted to the circuit board 2 and having a guide groove (guiding portion) for guiding and supporting the circuit board 2, is formed outside of the housing 1 and on the flange portion 1f. Further, a holding piece 1e projecting in a direction of a front wheel, mentioned later, and a flange portion 1f extended outwardly from the holding piece 1e for arranging the elastic member 4, mentioned later in details, are formed at the periphery of the first accommodating portion 1b. Also, a magnetism detecting face 1g corresponding to a detecting face 3a of the magnetic conversion element 3 arranged to the second accommodating portion 1d via the circuit board 2, mentioned later in details, is formed on the inner wall of the above-described first accommodating portion 1b.

The circuit board 2 includes a substrate made of an insulating material such as paper phenol, glass epoxy or the like upon which a predetermined wiring pattern is formed. The magnetic conversion element 3 and electronic parts, not illustrated, comprising condensers and the like are electrically fixed to the circuit board 2 by solder or the like. Further, to the circuit board 2 includes wiring cords 7 for supplying the magnetic conversion element 3 with power supply and transmitting an output signal from the magnetic conversion element 3 to an indicating instrument (for example, speedometer), not illustrated, that are electrically connected to predetermined portions thereof by soldering.

The circuit board 2 is arranged at the second accommodating portion id along the guide groove 1c such that the detecting face 3a of the magnetic conversion element 3 is brought into contact with the inner side face of the magnetic detecting face 1g that is formed at the first accommodating portion 1b of the housing 1. The circuit board 2 is arranged in the second accommodating portion 1d along the guide groove 1c and thereafter, fixed to the second accommodating portion 1d by means of a sealing member 8 made of epoxy or the like.

The elastic member 4 is made of a rubber material of a nitril or silicone type material etc. The elastic member 4 is constituted by a thin cylindrical shape where a groove portion 4a having a sectional shape of a substantially V-like form at the side end face thereof, and an erected portion 4b extended upwardly from the groove portion 4a, are formed. Further, a holding member 4c made of a metal material having the sectional shape of a substantially L-like form, is formed by inserting it into the inside of the erected portion 4b and the inner periphery of the erected portion 4b is formed smaller than the outer periphery of the holding piece 1e of the housing 1 and therefore, the erected portion 4b and the flange portion 1f of the housing 1 are arranged to be brought into contact with each other by press-fitting the holding member 4c to the holding piece 1e.

The spacer 5 is provided with a flat plane shape having an insertion hole 5a for inserting the inserting portion 1a of the housing 1, and is made of a resin material such as polyacetal, nylon or the like. The spacer 5 is arranged between an inner bottom portion 1h of the first accommodating portion 1b of the housing 1 and the magnet 6 for preventing wear of the respective members.

The magnet 6 comprises, for example, a plastic magnet or the like, in which a cylindrical portion 6a for inserting the inserting portion 1a of the housing 1 is formed and a plurality of rotation support pieces 6b extended outwardly from the periphery of the cylindrical portion 6a for rotating the cylindrical portion 6a in synchronism with the front wheel, are formed on the side of a contact face of the cylindrical portion 6a for contacting a hub of the front wheel, mentioned later. The above-described plurality of rotation support pieces 6b are formed to fit to a stopper portion formed at the hub of the front wheel and with regard to the cylindrical portion 6a, 8 poles are magnetized on the surface of the cylindrical portion 6a.

According to the rotation detector A constituted by the above-described respective portions, the elastic member 4 is press-fitted to the holding piece 1e of the housing 1, the erected portion 4b of the elastic member 4 is arranged to contact the flange portion 1f, the spacer 5 is arranged at the inner bottom portion 1h of the first accommodating portion 1b of the housing 1 and thereafter, the magnet 6 is arranged in the first accommodating portion 1b such that the inserting portion 1h of the housing 1 is inserted into the cylindrical portion 6a of the magnet 6 (A lubricant such as grease etc. is coated between the outer periphery of the inserting portion 1a and the inner face of the cylindrical portion 6a of the magnet 6, and between the cylindrical portion 6a of the magnet 6 and the spacer 5). Further, the circuit board 2 to which the magnetic conversion element 3 and electronic parts and the like, not illustrated, are mounted and the wiring cords 7 are electrically connected, is arranged to the second accommodating portion 1d of the housing 1 along the guide groove 1c of the housing 1 such that the detecting face 3a of the magnetic conversion element 3 is brought into contact with the inner face of the magnetism detecting face 1g formed on the inner face of the first accommodating portion 1b of the housing 1. The sealing member 8 such as epoxy or the like is filled in the second accommodating portion 1d in a state where, for example, a predetermined pressure is applied on the end face of the circuit board 2 on the side where the connecting wiring cords 7 are positioned such that the circuit board 2 does not float up, and is cured whereby the rotation detector A is completed.

Figure 3:
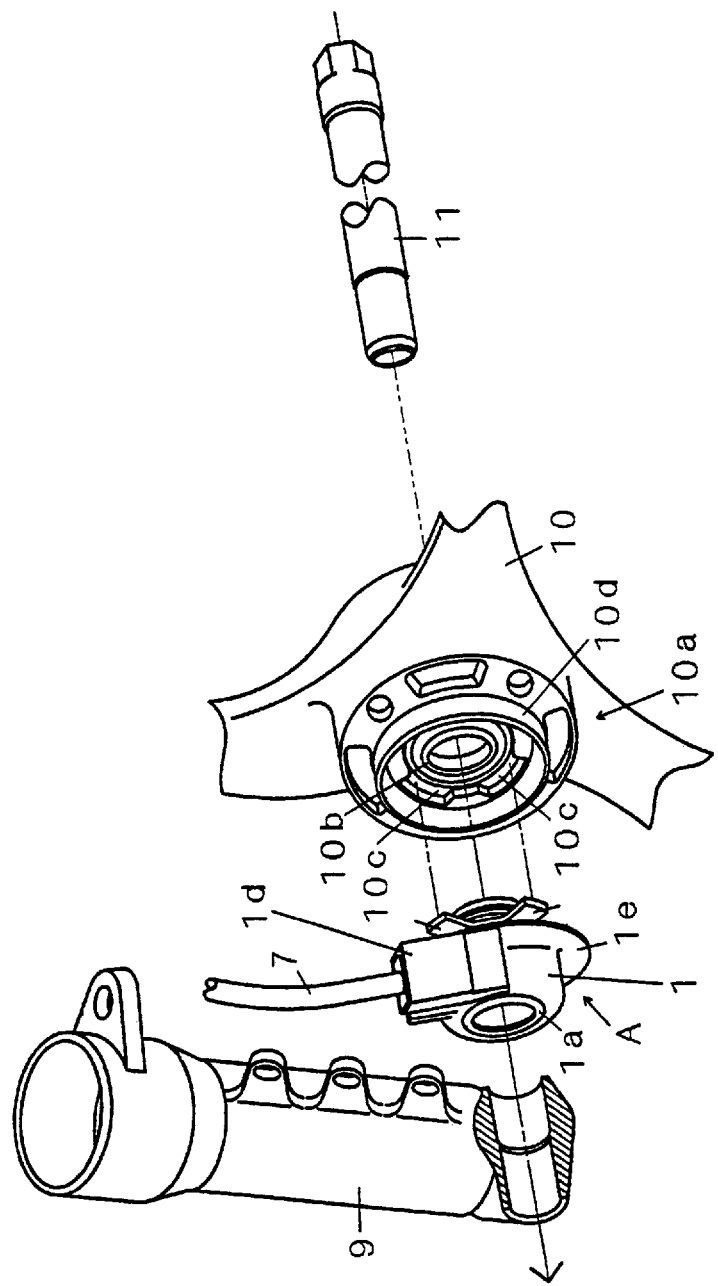
FIG. 3 is a view showing a state of attaching the rotation detector of the present invention.
Figure 3:
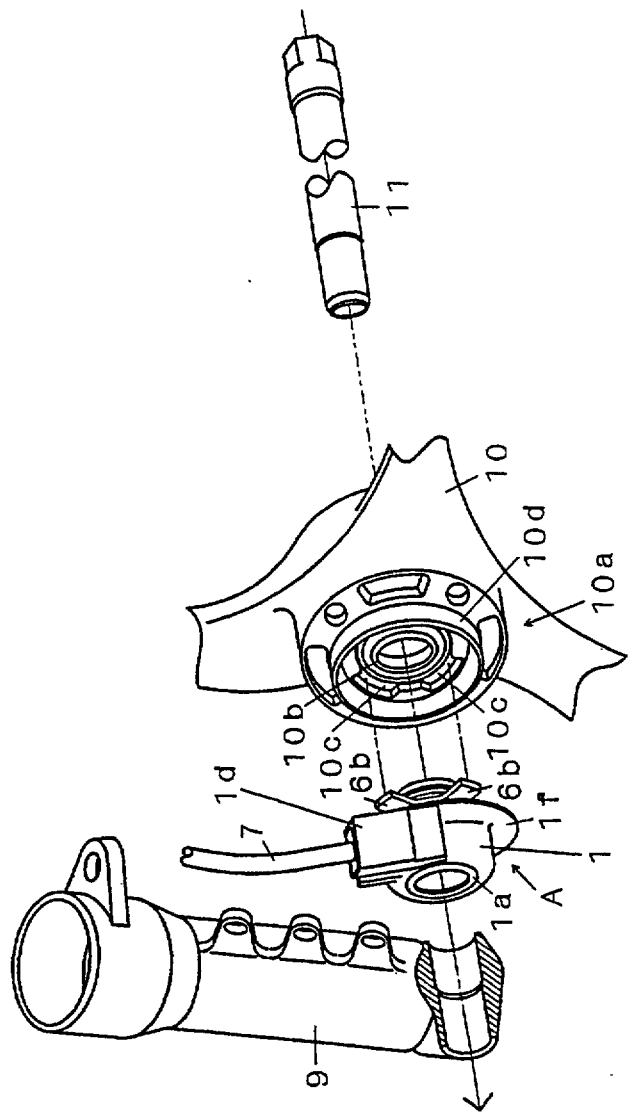

Next, an explanation will be given of a case where the rotation detector A having such a constitution is attached to a front wheel of a motorcycle in reference to FIG. 3.

Numeral 9 designates a front fork supporting a front wheel of a motorcycle, numeral 10 designates a front wheel (wheel) and numeral 11 designates a wheel shaft rotatably supporting the front wheel 10.

After coating a lubricant such as grease etc. to the groove portion 4a, the wheel shaft 11 inserted into a through hole 10b formed at the center of a hub 10a of the front wheel 10, is inserted into the inserting portion 1a of the housing 1, the rotation support pieces 6b formed in the magnet 6 are fitted into a stopper portion 10c formed in the hub 10a and the side face of the elastic member 4 forming the groove portion 4a is arranged to contact the inner periphery of a cylindrical erected portion 10d formed in the hub 10a by which the rotation detector A is mounted between the front fork 9 and the front wheel 10.

According to the rotation detector A having such a constitution, the magnet 6 is rotated in synchronism with the rotation of the front wheel 10, a change in the magnetic poles magnetized on the cylindrical portion 6a of the magnet 6, is detected by the magnetic conversion element 3 arranged at the magnetism detecting face 1g formed in the housing 1 and the detected signal is transmitted to an outside indicating instrument, not illustrated, via the wiring cords 7, whereby accurate detection of rotation can be provided since the detector does not receive influence of detection noise due to the vibration of an object for detection (teeth of a transmission gear, sprocket gear or the like) as in the conventional case.

The magnetism detecting face 1g is formed on the inner wall of the first accommodating portion 1b in correspondence with the detecting face 3a of the magnetic conversion element 3 arranged in the second accommodating portion 1d of the housing 1 via the circuit board 2, by which the detection distance between the detecting face 3a of the magnetic conversion element 3 and the cylindrical portion 6a of the magnet 6 can preferably be secured and a troublesome adjusting step of adjusting the detection distance between the object for detection and the detecting face of the rotation detector in the conventional case is dispensed with whereby the integrating operation performance of the rotation detector A can be improved.

Also, the holding piece 1e protruded in the direction of the wheel 10 and the flange portion 1f extended outwardly from the holding piece 1e, are formed at the periphery of the first accommodating portion 1b of the housing 1 and the elastic member 4 at the side end face of which the groove portion coated with a lubricant such as grease etc. is formed, is arranged at the flange portion if by press-fitting it to the holding piece 1e by which at a portion where the hub 10a of the wheel 10 and the rotation support pieces 6b of the magnet 6 are brought into contact with each other, the vibration from the wheel caused in running the vehicle is attenuated, the burden on the rotation support pieces 6b in contact with the hub 10a is attenuated and the rotation of the wheel 10 is preferably secured and invasion of water, mud, dust and the like to the portion of the hub 10a for attaching the rotation detector A can be prevented.

Incidentally, although the magnet 6 according to the embodiment is integrally formed with the magnetized cylindrical portion 6a and the rotation supporting pieces 6b by using a plastic magnet material, the present invention is not limited to the embodiment and, for example, the cylindrical portion and the rotation supporting pieces may separately be formed and the respective portions may be assembled so far as the magnet body is rotated in synchronism with the rotation of the wheel in respect of the inserting portion provided in the housing.

Although the magnetism detecting face 1g is formed at the first accommodating portion 1b of the housing 1, the magnetism detecting face 1g may not be necessarily provided in the rotation detector of the present invention as long as the detection distance between the magnet 6 and the magnetic conversion element 3 is preferably secured. For example, the magnetism detecting face 1g can be dispensed with by molding the magnetic conversion element in the housing by insertion forming and maintaining preferably the detection distance between the magnetic body and the magnetic conversion element.

Further, although according to the embodiment, the guide groove 1c is formed at the second accommodating portion 1d of the housing 1 and the guide portion is constituted to guide and support the circuit board 2, the guide portion may be constituted by, for example, two guides supporting the end faces of the circuit board 2.

According to the rotation detector of present invention, the housing having the inserting portion for inserting the wheel shaft and mounted to the wheel shaft, the magnet to which the inserting portion is inserted such that the magnet is rotated in synchronism with the wheel mounted to the wheel shaft and the magnetic conversion element for detecting the change in the magnetic poles of the magnet, are provided, the first accommodating portion formed at the periphery of the inserting portion for accommodating the magnet and the second accommodating portion for arranging the magnetic conversion element at the proximity of the magnet, are formed in the housing. Especially, the housing having the cylindrical inserting portion into which the wheel shaft is inserted and mounted to the wheel shaft, the magnet having the rotation support pieces for rotating in synchronism with the wheel mounted to the wheel shaft and the magnetized cylindrical portion into which the inserting portion is inserted, and the magnetic conversion element mounted to the circuit board for detecting the change in the magnetic poles magnetized at the cylindrical portion, are provided, the first accommodating portion formed at the periphery of the inserting portion for accommodating the magnet and the second accommodating portion for arranging the magnetic conversion element, are formed in the housing and the circuit board is arranged along the guide portion formed in the second accommodating portion whereby the magnetic conversion element is arranged at the proximity of the magnet. The magnet is rotated in synchronism with the rotation of the wheel and the change in the magnetic poles magnetized at the cylindrical portion of the magnet can be detected by the magnetic conversion element whereby accurate detection of rotation can be provided since the detector does not receive influence of detection noise due to the vibration of an object for detection (teeth of a transmission gear, sprocket gear etc.) as in the conventional case.

Further, the magnetism detecting face corresponding to the detecting face of the magnetic conversion element arranged in the second accommodating portion, is formed on the inner wall of the first accommodating portion and the detection distance between the detecting face of the magnetic conversion element and the magnet can preferably be secured whereby accurate detection of rotation can be provided and the integrating operation performance of the rotation detector can be improved since the troublesome adjusting step of adjusting the detection distance between an object for detection and the detecting face of the rotation detector in the conventional case is dispensed with.

Further, the holding piece projected in the direction of the wheel and the flange portion extended outwardly from the holding piece are formed at the periphery of the first accommodating portion of the housing and the elastic member arranged on the flange portion along the holding piece, is provided and the groove portion is formed at the side end face of the elastic member by which at the portion where the hub of the wheel and the rotation supporting pieces of the magnet are brought into contact with each other, the vibration from the wheel caused in running the vehicle is attenuated by the elastic member, the burden on the rotation supporting pieces is attenuated and the rotation of the wheel is preferably secured and invasion of water, mud, dust and the like to the portion of the hub of the wheel for attaching the rotation detector can be prevented.

The many features and advantages of the invention are apparent from the detailed specification, and thus, it is intended by the appended claims to cover all such features and advantages of the invention which fall within the true spirit and scope of the invention. Since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A rotation detector comprising:
   a housing including an inserting portion extending therefrom, said housing and said inserting portion containing an aperture configured for receiving a wheel shaft therethrough;
   a magnet, generally ring shaped, coupled to a wheel that is fixedly mounted on the wheel shaft; and
   a magnetic conversion element, positioned at a portion of the housing in proximity of the magnet, for detecting changes in magnetic poles of said magnet, said changes being indicative of rotational displacement by said wheel;
   wherein:
      said inserting portion is inserted into said magnet, and said magnet rotates in synchronism with said wheel, relative to said inserting portion.

2. A rotation detector comprising:
   a housing including an inserting portion extending therefrom, said housing and said inserting portion containing an aperture configured for receiving a wheel shaft therethrough;
   a magnet, generally ring shaped, coupled to a wheel that is fixedly mounted on the wheel shaft; and
   a magnetic conversion elements positioned at a portion of the housing in proximity of the magnet, for detecting changes in magnetic poles of said magnet, said changes being indicative of rotational displacement by said wheel:
   said housing further including:
      a first accommodating portion formed at a periphery of the inserting portion for accommodating said magnet, and
      a second accommodating portion for positioning the magnetic conversion element in a proximity of the magnet;
   wherein:
      said inserting portion is inserted into said magnet, and said magnet rotates in synchronism with said wheel, relative to said inserting portion.

3. The rotation detector according to claim 2, wherein:
   said magnetic conversion element includes a detecting face; and
   said first accommodating portion includes a magnetism detecting face, corresponding to the detecting face of said magnetic conversion element, formed on an inner wall thereof.

4. The rotation detector according to claim 2, further comprising:
   a holding piece formed at a periphery of the first accommodating portion of the housing, and projecting in a direction of the wheel; and
   a flange portion extending outwardly from said holding piece; and
   an elastic member arranged on the flange portion and provided along the holding piece.

5. The rotation detector according to claim 4, wherein said elastic member includes a groove portion formed at a side end face thereof.

6. A rotation detector comprising;
   a housing including a cylindrical inserting portion extending from the housing, said housing and said inserting portion containing an aperture configured for receiving a wheel shaft therethrough;
   a magnet, generally ring shaped coupled to a wheel fixedly mounted on the wheel shaft, said magnet including:
      a plurality of rotation support pieces for rotating in synchronism with a wheel mounted to the wheel shaft, and
      a cylindrical portion into which said inserting portion is inserted, said cylindrical portion being magnetized; and
   a magnetic conversion element mounted to a circuit board for detecting a change in magnetic poles of the cylindrical portion;
   said housing further including:
      a first accommodating portion formed at a periphery of the inserting portion for accommodating the magnet, and a second accommodating portion for accommodating the magnetic conversion element;

said circuit board being located along a guide portion formed in the second accommodating portion.

7. The rotation detector according to claim 6, wherein:

said magnetic conversion element includes a detecting face; and said first accommodating portion includes a magnetism detecting face, corresponding to the detecting face of said magnetic conversion element, formed on an inner wall thereof.

8. The rotation detector according to claim 6, further comprising:

holding piece formed at a periphery of the first accommodating portion of the housing, and projecting in a direction of the wheel; and a flange portion extending outwardly from said holding piece; and an elastic member arranged on the flange portion and provided along the holding piece.

9. The rotation detector according to claim 8, wherein said elastic member includes a groove portion formed at a side end face thereof.

* * * * *

UNITED STATES PATENT AND TRADEMARK OFFICE
CERTIFICATE OF CORRECTION

PATENT NO. : 5,880,585
DATED : March 9, 1999
INVENTOR(S) : Yuji Oguro

It is certified that error appears in the above-identified patent and that said Letters Patent is hereby corrected as shown below:

The Title Page should be deleted to appear as per attached.

Drawing sheet 3 of 3 should be deleted and substitute the attached Drawing sheet 3 of 3.

Signed and Sealed this

Nineteenth Day of October, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,880,585
DATED : March 9, 1999
INVENTOR(S) : Yuji Oguro

Page 2 of 4

It is certified that error appears in the above-indentified patent and that said Letters Patent is hereby corrected as shown below:

In the drawings, Sheet 3, Figure 3, please insert --6b--, and change "1e" to --1f--, as shown below:

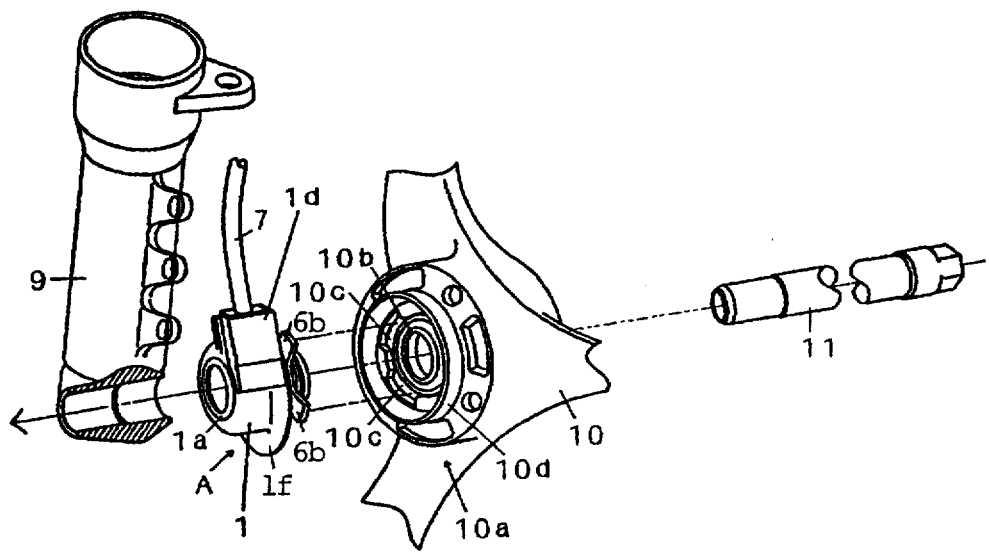

FIG. 3

United States Patent [19]

Oguro

[11] Patent Number: 5,880,585

[45] Date of Patent: Mar. 9, 1999

[54] APPARATUS INCLUDING A WHEEL COUPLED RING SHAPED MAGNET, FOR DETECTING ROTATION OF A WHEEL IN A TWO-WHEELED VEHICLE

[75] Inventor: Yuji Oguro, Niigata, Japan

[73] Assignee: Nippon Seiki K.K., Niigata, Japan

[21] Appl. No.: 807,744

[22] Filed: Feb. 27, 1997

[30] Foreign Application Priority Data

Feb. 28, 1996 [JP] Japan .................................. 8-41240

[51] Int. Cl.$^6$ .............................. G01P 3/487; G01P 1/02; G01P 3/44
[52] U.S. Cl. ................. 324/174; 73/514.39; 324/207.22
[58] Field of Search ........................ 324/173, 174, 324/207.2, 207.21, 207.22, 207.25; 73/514.39; 180/170; 188/181 R; 303/138; 384/448; 340/671

[56] References Cited

U.S. PATENT DOCUMENTS

| 3,731,533 | 5/1973 | Geery ............................ 324/174 X |
| 3,915,266 | 10/1975 | Lantz . |
| 4,257,040 | 3/1981 | Shirasaki et al. ............... 324/174 X |

FOREIGN PATENT DOCUMENTS

| 113374 | 9/1979 | Japan ............................... 324/174 |
| 2-264817 | 10/1990 | Japan . |

Primary Examiner—Gerard Strecker
Attorney, Agent, or Firm—McDermott, Will & Emery

[57] ABSTRACT

A rotation detector comprising a housing having an inserting portion for inserting a wheel shaft, a magnet, to be coupled to a wheel mounted to the wheel shaft, into which the inserting portion is inserted such that the magnet is rotated in synchronism with the wheel mounted to the wheel shaft, and a magnetic conversion element arranged at a portion of the housing in the proximity of the magnet.

9 Claims, 3 Drawing Sheets

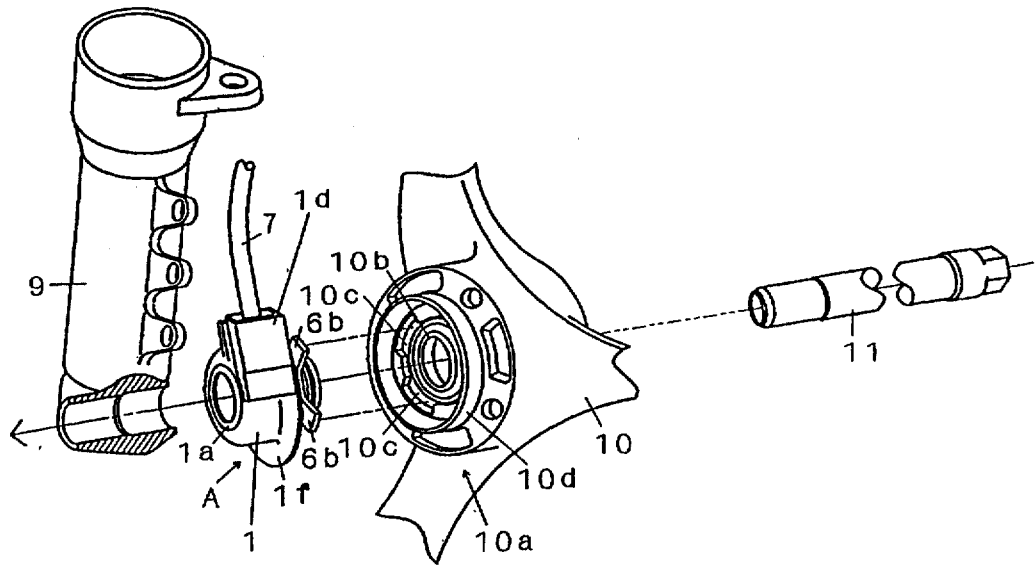

FIG. 3